(12) United States Patent
Sehanobish et al.

(10) Patent No.: US 6,300,419 B1
(45) Date of Patent: Oct. 9, 2001

(54) PROPYLENE POLYMER COMPOSITION

(75) Inventors: Kalyan Sehanobish, Lake Jackson, TX (US); Harry Craig Silvis, Midland, MI (US); Marie L. Hare, Lake Jackson, TX (US); Wendy D. Hoenig, Lake Jackson, TX (US); John Newton, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/457,034

(22) Filed: Dec. 8, 1999

(51) Int. Cl.[7] .............................. C08F 8/00; C08L 45/00; C08L 33/02; C08L 33/04; C08L 35/02

(52) U.S. Cl. .......................... 525/191; 525/210; 525/221; 525/222; 525/227; 525/228; 525/232; 525/240; 525/241; 524/443; 524/445; 524/451; 524/493; 524/499; 524/500

(58) Field of Search .................................. 525/191, 210, 525/221, 222, 227, 228, 232, 240, 241; 524/443, 445, 451, 493, 499, 500

(56) References Cited

U.S. PATENT DOCUMENTS

| | | |
|---|---|---|
| 3,236,917 | 2/1966 | Natta et al. . |
| 3,424,703 | 1/1969 | Jones, Jr. . |
| 3,645,992 | 2/1972 | Elston . |
| 4,701,432 | 10/1987 | Welborn, Jr. . |
| 4,798,081 | 1/1989 | Hazlitt et al. . |
| 4,889,885 | 12/1989 | Usuki et al. . |
| 4,935,397 | 6/1990 | Chang . |
| 4,937,299 | 6/1990 | Ewen et al. . |
| 4,937,301 | 6/1990 | Chang . |
| 4,950,541 | 8/1990 | Tabor et al. . |
| 5,055,438 | 10/1991 | Canich . |
| 5,091,461 | 2/1992 | Skochdople . |
| 5,194,509 | 3/1993 | Hasenbein et al. . |
| 5,272,236 | 12/1993 | Lai et al. . |
| 5,278,272 | 1/1994 | Lai et al. . |
| 5,391,618 | 2/1995 | Yamamoto et al. . |
| 5,424,362 | 6/1995 | Hwang et al. . |
| 5,576,374 | 11/1996 | Betso et al. . |
| 5,639,816 | 6/1997 | Yamaguchi et al. . |
| 5,639,829 | 6/1997 | Yamaguchi et al. . |
| 5,641,821 | 6/1997 | Seiler et al. .................. 524/232 |
| 5,681,897 | * 10/1997 | Silvis et al. .................. 525/150 |
| 5,763,534 | 6/1998 | Srinivasan et al. .................. 525/240 |

FOREIGN PATENT DOCUMENTS

| | | |
|---|---|---|
| 260999 | 3/1988 | (EP) . |
| 129368 | 7/1989 | (EP) . |
| 0 639 613 A1 | 4/1994 | (EP) . |
| 0 391 413 B1 | 12/1996 | (EP) . |
| 0 593 221 B1 | 8/1998 | (EP) . |

OTHER PUBLICATIONS

Modern Plastics Encyclopedia/89, mid Oct. 1988 Issue, vol. 65, No. 11, pp. 86–92.

* cited by examiner

*Primary Examiner*—Nathan M. Nutter

(57) ABSTRACT

Disclosed are propylene polymer compositions comprising a high crystalline propylene polymer, a substantially linear ethylene polymer, linear ethylene polymer or combinations thereof, an optional filler and an optional additional polymer. Said propylene polymer compositions have improved processability with a good balance of stillness and toughness which demonstrates improved scratch resistance in injection molded articles.

20 Claims, No Drawings

PROPYLENE POLYMER COMPOSITION

FIELD OF THE INVENTION

This invention relates to propylene polymer compositions comprising a high crystalline polypropylene and a polyolefin elastomer. This invention relates particularly to a propylene polymer composition comprising a high crystalline polypropylene and a substantially linear ethylene polymer or a linear ethylene polymer having improved processability with a good balance of stiffness and toughness which demonstrates improved scratch resistance in injection molded articles.

BACKGROUND OF THE INVENTION

Polypropylene, especially highly isotactic polypropylene, has been used in many applications in the form of molded articles, film, sheet, etc., because it is excellent in molding processability, toughness, moisture resistance, gasoline resistance, chemical resistance, has a low specific gravity, and is inexpensive. The use of polypropylene polymers is expanding at an increasing rate in the fields of exterior and interior automotive trims, in electrical and electrical equipment device housing and covers as well as other household and personal articles.

However, polypropylene is poor or inadequate in heat resistance, stiffness, scratch resistance and impact resistance. These deficiencies are obstacles to opening up new applications for polypropylene, particularly applications which have traditionally been injection molded. In order to overcome these shortcomings, especially inadequate impact resistance, polypropylene has been blended with a rubbery elastic material such as ethylene-propylene copolymer rubber, ethylene-propylene-diene copolymer rubber or ethylene-butene copolymer rubber. For examples, see U.S. Pat. No. 5,391,618 which discloses low crystalline polypropylene polymer compositions comprising an ethylene alpha-olefin copolymer, U.S. Pat. No. 5,576,374 which discloses polypropylene polymer compositions comprising a substantially linear ethylene polymer and U.S. Pat. No. 5,639,829 which discloses propylene polymer compositions comprising an ethylene and 1-buttene random copolymer. However, while impact properties are improved these propylene polymer compositions do not achieve a good balance of stiffness and toughness.

In view of the deficiencies of the conventional propylene polymers and blends thereof, it would be highly desirable to provide a propylene polymer composition which exhibits improved processability with a good balance of stiffness and toughness which demonstrates improved scratch resistance in injection molded articles.

SUMMARY OF THE INVENTION

The present invention is such a desirable propylene polymer composition. The composition possesses a desirable balance of improved processability with a good balance of stiffness and toughness which demonstrates improved scratch resistance in injection molded articles. The propylene polymer composition of the present invention comprises from about 55 to about 80 parts by weight of a high crystalline isotactic propylene polymer having a crystalline phase determined by differential scanning calorimetry equal to or greater than about 62 weight percent based on the weight of the high crystalline propylene polymer; from about 20 to about 45 parts by weight of a substantially linear ethylene polymer, a linear ethylene polymer or combinations thereof wherein the substantially linear ethylene polymer and linear ethylene polymer are characterized as having a density of less than about 0.93 g/cm3, a molecular weight distribution, Mw/Mn, of less than about 3.0, and a Composition Distribution Branch Index of greater than 30 percent; from 0 to about 50 parts by weight of a filler; and from 0 to about 15 parts by weight of an additional polymer, parts by weight based on the weight of the total composition.

In another aspect, the present invention is a process for preparing a propylene polymer composition described hereinabove which exhibits a desirable balance of improved processability with a good balance of stiffness and toughness which demonstrates improved scratch resistance in injection molded articles wherein a high crystalline propylene polymer is blended with an effective amount of a substantially linear ethylene polymer, a linear ethylene polymer or combinations thereof, optionally a filler and optionally an additional polymer.

In a further aspect, the present invention involves a method of molding or extruding a propylene polymer blend composition described hereinabove.

In yet a further aspect, the invention involves molded or extruded articles of a propylene polymer blend composition described hereinabove. The propylene polymer compositions of the present invention are especially useful in the preparation of molded objects notably articles having large surfaces prepared by injection molding techniques requiring a good balance ol strength and toughness and good scratch resistance. Such properties are particularly desired for exterior and interior automotive trims, for example, bumper beams, bumper fascia, pillars, instrument panels and the like; in electrical and electrical equipment device housing and covers; as well as other household and personal articles, including, for example, appliance housings, housewares, freezer containers, and crates; lawn and garden furniture; building & construction sheet, etc.

DETAILED DESCRIPTION OF THE EMBODIMENTS

Component (a) in the propylene polymer compositions of this invention is a high crystalline polypropylene. The high crystalline polypropylene suitable for use in this invention is well known in the literature and can be prepared by known techniques. In general, the high crystalline polypropylene is in the isotactic form, although other forms can also be used (e.g., syndiotactic or atactic). The high crystalline polypropylene used for the present invention is preferably a homopolymer of polypropylene or a copolymer, for example, a random or block copolymer, of propylene and an alpha-olefin, preferably a $C_2$ or $C_4$ to $C_{20}$ alpha-olefin. The alpha-olefin is present in the high crystalline polypropylene of the present invention in an amount of not more than 20 percent by mole, preferably not more than 15 percent, even more preferably not more than 10 percent and most preferably not more than 5 percent by mole.

Examples of the $C_2$ and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1 -hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

In the present invention, a propylene homopolymer is the preferred high crystalline polypropylene.

The high crystalline polypropylene of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometallic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

High crystallinity polypropylene is commonly made by catalytically reacting propylene in a polymerization reactor with appropriate molecular weight control agents. Nucleating agent is added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in Modern Plastics Encyclopedia/89, mid October 1988 Issue, Volume 65, Number 11, pp. 86–92, the entire disclosure of which is incorporated herein by reference. The molecular weight of the high crystalline polypropylene for use in the present invention is conveniently indicated using a melt flow measurement, sometimes referred to as melt flow rate (MFR) or melt index (MI), according to ASTM D 1238 at 230° C. and an applied load of 2.16 kilogram (kg). Melt flow rate is inversely proportional to the molecular weight of the polymer. Thus, the higher the molecular weight, the lower the melt flow rate, although the relationship is not linear. The melt flow rate for the high crystalline polypropylene useful herein is generally greater than about 0.1 grams/10 minutes (g/10 min.), preferably greater than about 0.5 g/10 min., more preferably greater than about 1 g/10 min., and even more preferably greater than about 10 g/10 min. The melt flow rate for the high crystalline polypropylene useful herein is generally less than about 200 g/10 min., preferably less than about 100 g/10 min., more preferably less than about 75 g/10 min., and more preferably less than about 50 g/10 min.

The high crystalline polypropylene polymer as component (a) may be characterized also by its crystalline structure.

One method to characterize crystallinity is by the pulse nuclear magnetic resonance (NMR) method of K. Fujimoto, T. Nishi and R. Kado, Polymer Journal Volume 3, 448–462 (1972) wherein crystalline phase (I), intermediate phase (II) and amorphous (III) phase are determined. Preferably the weight ratio of the crystalline phase (I)/the intermediate phase (II) is greater than about 4, preferably greater than about 5, more preferably greater than about 8 and most preferably greater than about 10. The content of the amorphous phase (III) is from at least about 1, preferably from at least about 2, more preferably from at least about 5, even ore preferably from at least about 10 and most preferably from at least about 15 weight percent. The content of the amorphous phase (III) is less than about 40, preferably less than about 30, more preferably less than about 25, even more preferably less than 20 and most preferably less than about 15 percent by weight.

Generally, in pulse NMR determinations, an energy pulse is applied to a spinning polymer sample at high resolution over a specified range of temperature at specific temperature intervals (temperature in degrees Kelvin, °K). The resulting energy is monitored in the time domain (microsecond time scale). The energy/time curve is a measure of the time needed for the polymer to return from the excited energy state back to its ground energy level. This is called the Free Induction Decay (FID) curve. The curve is then mathematically broken down into a fast Gaussian equation (usually associated with crystallinity), a slow Gaussian equation and one exponential equation. The last two equations are usually associated with the polymers amorphous phase and an intermediate phase that is between the crystallinity and amorphous properties, respectively. These equations are used to calculate coefficients that characterize the appropriate amplitude and time components of the FID curve. The coefficients are then placed in a matrix and undergo regression processes such as partial least squares. The crystalline, amorphous, and intermediate phases are calculated and reported as weight percents as a function of temperature, ° K.

However, a more preferable method of determining crystallinity in the high crystalline polypropylene polymer is by differential scanning calorimetry (DSC). A small sample (milligram size) of the propylene polymer is sealed into an aluminum DSC pan. The sample is placed into a DSC cell with a 25 centimeter per minute nitrogen purge and cooled to about −100° C. A standard thermal history is established for the sample by heating at 10° C. per minute to 225° C. The sample is then cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity, \%} = \frac{\Delta H_{observed}}{\Delta H_{isotactic\ PP}} \times 100$$

where the heat of fusion for isotactic polypropylene ($\Delta H_{isotactic\ PP}$), as reported in B. Wunderlich, Macromolecular Physics, Volume 3, Crystal Melting, Academic Press, New Your, 1980, p 48, is 165 Joules per gram (J/g) of polymer.

The degree of crystallinity for the high crystalline propylene polymer as determined by DSC is at least about 62 weight percent, preferably at least about 64 weight percent, more preferably at least about 66 weight percent, even more preferably at least about 68 weight percent and most preferably at least about 70 weight percent based on the weight of the high crystalline propylene polymer. The degree of crystallinity for the high crystalline propylene polymer as determined by DSC is less than or equal to about 100 weight percent, preferably less than or equal to about 90 weight percent, more preferably less than or equal to about 80 weight percent, and most preferably less than or equal to about 70 weight percent based on the weight of the high crystalline propylene polymer.

Part or all of the propylene polymer of the present invention may be graft modified. A preferred graft modification of the polypropylene is achieved with any unsaturated organic compound containing, in addition to at least one ethylenic unsaturation (e.g., at least one double bond), at least one carbonyl group(—C═O) and that will graft to a polypropylene as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound containing at least one carbonyl group can be grafted to the polypropylene by any known technique, such as those taught in U.S. Pat. Nos. 3,236,917 and 5,194,509. For example, polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. Alternatively, the reaction temperature is higher, e.g., 210° C. to 300° C., and a free radical initiator is not used or is used at a reduced concentration. An alternative and preferred method of grafting is taught in U.S. Pat. No. 4,905,541, the disclosure of which is incorporated herein by reference, by using a twin-screw devolatilizing extruder as the mixing apparatus. The polypropylene and unsaturated organic compound are mixed and reacted within the extruder at temperatures at which the reactors are molten and in the presence of a free radical initiator. Preferably, the unsaturated organic compound is injected into a zone maintained under pressure in the extruder.

The unsaturated organic compound content of the grafted polypropylene is at least about 0.01 weight percent, preferably at least about 0.1 weight percent, more preferably at least about 0.5 weight percent, and most preferably at least about 1 weight percent based on the combined weight of the polypropylene and organic compound. The maximum amount of unsaturated organic compound content can vary to convenience, but typically it does not exceed about 10 weight percent, preferably it does not exceed about 5 weight percent, more preferably it does not exceed about 2 weight percent and most preferably it does not exceed about 1 weight percent based on the combined weight of the polypropylene and the organic compound.

The high crystalline polypropylene or graf-modified high crystalline polypropylene is employed in the propylene polymer blend compositions of the present invention in amounts sufficient to provide the desired processability and good balance of stiffness and toughness. If present, the graft-modified high crystalline polypropylene can be employed in an amount equal to 100 weight percent of the total weight of the high crystalline polypropylene, preferably in an amount up to or equal to 50 weight percent, more preferably up to or equal to 30 weight percent, even more preferably up to or equal to 20 weight percent and most preferably up to or equal to 10 weight percent of the weight of the high crystalline polypropylene. In general, the high crystalline polypropylene, graft-modified high crystalline polypropylene or mixture thereof is employed in an amount of at least about 40 parts by weight, preferably at least about 45 parts by weight, more preferably at least about 50 parts by weight, even more preferably at least about 55 parts by weight, and most preferably at least about 60 parts by weight based on the weight of the total composition. In general, the high crystalline polypropylene, graft-modified high crystalline polypropylene or mixture thereof is used in amounts less than or equal to about 95 parts by weight, preferably less than or equal to about 90 parts by weight, more preferably less than or equal to about 80 parts by weight, even more preferably less than or equal to about 70 parts by weight, and most preferably less than or equal to about 60 parts by weight based on the weight of the total composition.

Component (b) in the compositions of this invention is a polyolefin elastomer. Suitable polyolefin elastomers comprises one or more $C_2$ to $C_{20}$ alpha-olefins in polymerized form, having a glass transition temperature ($T_g$) less than 25° C., preferably less than 0° C., most preferably less than −25° C. $T_g$ is the temperature or temperature range at which a polymeric material shows an abrupt change in its physical properties, including, for example, mechanical strength. $T_g$ can be determined by differential scanning calorimetry. Examples of the types of polymers from which the present polyolefin elastomers are selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

Preferably, the polyolefin elastomer is one or more substantially linear ethylene polymer or one or more linear ethylene polymer (S/LEP), or a mixture of one or more of each. Both substantially linear ethylene polymers and linear ethylene polymers are known. Substantially linear ethylene polymers and their method of preparation are fully described in U.S. Pat. Nos. 5,272,236 and 5.278,272. Linear ethylene polymers and their method of preparation are fully disclosed in U.S. Pat. Nos. 3,645,992; 4,937,299; 4,701,432; 4,937, 301; 4,935,397; 5,055,438; EP 129,368; EP 260,999; and WO 90/07526.

As used here, "a linear ethylene polymer" means a homopolymer of ethylene or a copolymer of ethylene and one or more alpha-olefin comonomers having a linear backbone (i.e. no cross linking), no long-chain branching, a narrow molecular weight distribution and, for alpha-olefin copolymers, a narrow composition distribution. Further, as used here, "a substantially linear ethylene polymer" means a homopolymer of ethylene or a copolymer of ethylene and of one or more alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by insitu generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n−2") carbons, where n is the number of carbons of the largest alpha-olefin comonomer intentionally added to the reactor. Preferred long-chain branches in homopolymers of ethylene or copolymers of ethylene and one or inore $C_3$ to $C_{20}$ alpha-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering (GPC-LALS) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts capable of readily polymerizing high molecular weight alpha-olefin copolymers under the process conditions. As used here, copolymer means a polymer of two or more intentionally added comonomers, for example, as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefinis, preferably copolymers of ethylene and one or more $C_3$ to $C_{10}$, alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene polymers or linear ethylene polymers is equal to or greater than 0.850 grams per cubic centimeter ($g/cm^3$) and preferably equal to or greater than 0.860 $g/cm^3$. Generally, the density of these substantially linear ethylene polymers or linear ethylene polymers is less than or equal to about 0.935 $g/cm^3$ and preferably less than or equal to about 0.900 $g/cm^3$. The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is measured according to ASTM Designation D 1238 using conditions of 190° C. and 2.16 kilogram ("kg") mass. $I_{10}$ is measured according to ASTM Designation D 1238 using conditions of 190° C. and 10.0 kg mass.

The molecular weight distribution ($M_w/M_n$) for substantially linear ethylene polymers is the weight average molecular weight ($M_w$) divided by number average molecular weight ($M_n$). $M_w$ and $M_n$ are measured by gel permeation chromatography (GPC). For substantially linear ethylene polymers, the $I_{10}/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (I_{10}/I_2)-4.63$. Generally, $M_w/M_n$ for substantially linear ethylene polymers is at least about 1.5 and preferably at least about 2.0 and is less than or equal to about 3.5, more preferably less than or equal to about 3.0. In a most preferred embodiment, substantially linear ethylene polymers are also characterized by a single differential scanning calorimetry (DSC) melting peak.

The preferred $I_2$ melt index for these substantially linear ethylene polymers or linear ethylene polymers is from about 0.01 g/10 min. to about 100 g/10 min., and more preferably about 0.1 g/10 min. to about 10 g/10 min.

The substantially linear ethylene polymer or linear ethylene polymer is employed in the blends of the present invention in amounts sufficient to provide the desired balance of processability and impact resistance. In general, the substantially linear ethylene polymer or linear ethylene polymer is employed in amounts of at least to about 5 parts by weight, preferably at least about 10 parts by weight, more preferably at least about 20 parts by weight, even more preferably at least about 25 parts by weight and most preferably at least about 30 parts by weight based on the weight of the total composition. In general, the substantially linear ethylene polymer or linear ethylene polymer is used in amounts less than or equal to about 50 parts by weight, preferably less than or equal to about 45 parts by weight, more preferably less than or equal to about 40 parts by weight, even more preferably less than or equal to about 35 parts by weight and most preferably less than or equal to about 30 parts by weight based on the weight of the total composition.

Optionally, the propylene polymer composition comprises component (c) a filler such as calcium carbonate, talc, clay, mica, wollastonite, hollow glass beads, titanium oxide, silica, carbon black, glass fiber or potassium titanate. Preferred fillers are talc, wollastonite, clay, single layers of a cation exchanging layered silicate material or mixtures thereof. Talcs, wollastonites, and clays are generally known fillers for various polymeric resins. See for example U.S. Pat. Nos. 5,091,461 and 3,424,703; EP 639,613 A1; and EP 391,413, where these materials and their suitability as filler for polymeric resins are generally described.

Preferred talcs and clays are uncalcined having very low free metal oxide content. The mineral talcs best suited are hydrated magnesium silicates as generally represented by the theoretical formula

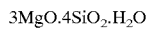

$3MgO.4SiO_2.H_2O$

Compositions of talcs may vary somewhat with locality in which they are mined. Montana talcs, for example, closely approach this theoretical composition. Suitable mineral talcs of this type are commercially available as VANTALC F2003 available from Orlinger and JETFIL™ 700C available from Minerals Technology.

Examples of preferred cation exchanging layered silicate materials include biophilite, kaolinite, dickalite or talc clays; smectite clays; vermiculite clays; mica; brittle mica; Magaduite; Kenyaite; Octosilicate; Kanemite; and Makatite. Preferred cation exchanging layered silicate materials are smectite clays, including montmorillonite, bidelite, saponite and hectorite.

Preferred fillers have an average length to thickness ratio (L/T) preferably from about 1 to about 10,000 and provide the desired levels of physical and other property requirements such as toughness and stiffness (modulus). Several varieties of cation exchanging layered silicate materials, talc, wollastonite, clay and mixtures thereof have been found to be especially suitable.

The suitability of cation exchanging layered silicate material fillers in maintaining the preferred levels of toughness and stiffness of molded articles prepared from the resin has been found to be a function of the average L/T of the filler particles together with obtaining a uniformly small particle-sized filler. Highly preferred are those compositions incorporating fillers having an average L/T as measured according to the below-described technique of at least about 1, preferably at least about 15, more preferably at least about 50, even more preferably at least about 100, and most preferably at least about 200. With regard to the maximum level for the L/T ratio, it has been found desirable to have a value up to and including about 10,000, preferably up to and including about 5,000, more preferably up to and including about 1,000, even more preferably up to and including about 500, and most preferably up to and including about 200.

The suitability of non-cation exchanging layered silicate material fillers, such as calcium carbonate, talc, clay, mica, wollastonite, hollow glass beads, titanium oxide, silica, carbon black, glass fiber, potassium, titanate, etc., in maintaining the preferred levels of toughness and stiffness of molded articles prepared from the resin has been found to be a function of the average L/T of the filler particles together with obtaining a uniformly small particle-sized filler. Highly preferred are those compositions incorporating fillers having an average L/T as measured according to the below-described technique of at least about 1, preferably at least about 1.5, more preferably at least about 2, even more preferably at least about 3, and most preferably at least about 4. With regard to the maximum level for the L/T ratio, it has been found desirable to have a value up to and including about 30, preferably up to and including about 20, more preferably up to and including about 15, even more preferably up to and including about 10, and most preferably up to and including about 4.

For determining the particle size and L/T ratio, the length of the fillers (or longest dimension, such as the diameter of a plate-shaped particle) as well as their thickness (shortest dimension of the 2 dimensions measurable) can be measured by preparing a filler modified polymeric resin sample and measuring the particle dimensions of the dispersed particles from digitized images produced by back scattered electron imaging using a scanning electron microscope and analyzing the digitized images in an image analyzer. Preferably, the size of the image is at least 10X the size of the maximum particle size.

The propylene polymer compositions included within the scope of this invention generally utilize such inorganic fillers with a number average particle size as measured by back scattered electron imaging using a scanning electron microscope of less than or equal to about 10 micrometers ($\mu$m) preferably less than or equal to about 3 $\mu$m, more preferably less than or equal to about 2 $\mu$m, more preferably less than or equal to about 1.5 $\mu$m and most preferably less than or equal to about 1.0 $\mu$m. In general, smaller average particle sizes equal to or greater than about 0.001 $\mu$m, preferably equal to or greater than about 0.01 $\mu$m, more preferably equal to or greater than about 0.1 $\mu$m, or most preferably equal to or greater than 0.5 $\mu$m, if available, could very suitably be employed.

Fillers may be employed to obtain optimized combinations of toughness and stiffness in the propylene polymer compositions according to the present invention. If present, the filler is employed in an amount of at least about 1 part by weight, preferably at least about 3 parts by weight, more preferably at least about 5 parts by weight, even more preferably at least about 10 parts by weight, and most preferably at least about 15 parts by weight based on the total weight of the composition. Usually it has been found sufficient to employ an amount of filler up to and including about 50 parts by weight, preferably up to and including about 40 parts by weight, more preferably up to and including about 30 parts by weight, more preferably up to and including about 25 parts by weight, more preferably up to and including about 20 parts by weight, and most preferably up to and including about 15 parts by weight based the total weight of the composition.

Optionally, the propylene polymer composition comprises component (d) an additional polymer which is a resin other than components (a) and (b) above. Preferred additional polymers are polyethylene, preferably low density polyethylene (LDPE), linear low density polyethylene (LLDPE), and high density polyethylene (HDPE), for example HDPE IP-60 high density polyethylene available from The Dow Chemical Company, polystyrene, polycyclohexylethane, polyesters, such as polyethylene terephthalate, ethylene/styrene interpolymers, syndiotactic PP, syndiotactic PS, ethylene/propylene copolymers, EPDM, and mixtures thereof. If present, the additional polymer is employed in amounts of at least about 1 part by weight, preferably at least about 3 parts by weight, more preferably at least about 5 parts by weight, even more preferably at least about 7 parts by weight and most preferably at least about 10 parts by weight based on the weight of the total composition. In general, the additional polymer is used in amounts less than or equal to about 40 parts by weight, preferably less than or equal to about 30 parts by weight, more preferably less than or equal to about 20 parts by weight, even more preferably less than or equal to about 15 parts by weight and most preferably 10 parts by weight based on the weight of the total composition.

The compositions of the present invention can comprise a slip agent. Preferred slip agents are a saturated fatty acid amide or ethylenebis(amide), an unsaturated fatty acid amide or ethylenebis(amide) or combinations thereof. The saturated fatty amides useful in the present invention conform essentially to the empirical formula $RC(O)NHR^1$ where R is a saturated alkyl group having of from 10 carbon atoms to 26 carbon atoms and $R^1$ is independently hydrogen or a saturated alkyl group having of from 10 carbon atoms to 26 carbon atoms. Compounds which conform to the above empirical structure are for example, palmitamide, stearamide, arachidamide, behenamide, stearyl stearamide, palmityl pamitamide, stearyl arachidamide and mixtures thereof.

The saturated ethylenebis(amides) useful in the present invention conform essentially to the empirical formula $RC(O)NHCH_2CH_2NHC(O)R$ where R is as defined previously. Compounds which conform to the above empirical structure are for example, stearamidoethylstearamide, stearamidoethylpalmitamide, palmitamido-ethylstearamide and mixtures thereof.

The unsaturated fatty amides useful in the present invention conform essentially to the empirical formula $R^2C(O)NHR^3$ where $R^2$ is an unsaturated alkyl group having of from 10 carbon atoms to 26 carbon atoms and $R^3$ is independently hydrogen or a unsaturated alkyl group having of from 10 carbon atoms to 26 carbon atoms. Compounds which conform to the above empirical structure are for example, oleamide, erucamide, linoleamide, and mixtures thereof.

The unsaturated ethylenebis(amides) useful in the present invention conform essentially to the empirical formula $R^4C(O)NHCH_2CH_2NHC(O)R^4$ where $R^4$ is either a saturated or unsaturated alkyl group having of from 10 carbon atoms to 26 carbon atoms with the proviso that at least one of $R^4$ is unsaturated. Compounds which conform to the above empirical structure include, erucamidoethylerucamide, oleamidoethyloleamide, erucamidoethyloleamide, oleamidoethylerucamide, stearamidoethylerucamide, erucamidoethylpalmitamide, palmitamidoethyloleamide and mixtures thereof Generally preferred concentrations of the saturated fatty acid amide or ethylene-bis(amide) are in the range of from about 0 parts to about 0.5 parts by weight, preferably of from about 0.025 parts to about 0.25 parts by weight and most preferably of from about 0.05 parts to about 0.15 parts by weight based on the weight of the total composition. Generally, preferred concentrations of the unsaturated fatty acid amide or ethylene-bis(amide) are in the range of from about 0 parts to about 1 parts by weight, preferably of from about 0.05 parts to about 0.75 parts by weight and most preferably of from about 0.1 parts to about 0.3 parts by weight based on the weight of the total composition.

Further, the claimed propylene polymer compositions may also optionally contain one or more additives that are commonly used in propylene polymer compositions o this type. Preferred additives of this type include, but are not limited to: ignition resistant additives, stabilizers, colorants, antioxidants, antistats, flow enhancers, mold releases, such as metal stearates (e.g., calcium stearate, magnesium stearate), nucleating agents, including clarifying agents, etc. Preferred examples of additives are ignition resistance additives, such as, but not limited to halogenated hydrocarbons, halogenated carbonate oligoimers, halogenated diglycidyl ethers, organophosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least about 0.01 parts, preferably at least about 0.1 parts, more preferably at least about 1 parts, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the propylene polymer compositions of this invention can be accomplished by any suitable mixing means known in the art, including dry blending the individual components and subsequently melt mixing, either directly in the extruder used to make the finished article (e.g., the automotive part), or pre-mixing in a separate extruder (e.g., a Banbury mixer). Dry blends of the compositions can also be directly injection molded without pre-melt mixing. Alternatively, the propylene polymer and the substantially linear ethylene polymer or linear ethylene polymer may be prepared in the same reactor.

The propylene polymer compositions of the present invention are thermoplastic. When softened or melted by the application of heat, the polymer blend compositions of this invention can be formed or molded using conventional techniques such as compression molding, injection molding, gas assisted injection molding, calendering, vacuum forming, thermoforming, extrusion and/or blow molding, alone or in combination. The polymer blend compositions can also be formed, spun, or drawn into films, fibers, multi-layer laminates or extruded sheets, or can be compounded with one or more organic or inorganic substances, on any machine suitable for such purpose. The propylene polymer compositions of the present invention are preferably injection molded. Some of the fabricated articles include exterior and interior automotive trims, for example, bumper beams, bumper fascia, pillars, instrument panels and the like; in electrical and electrical equipment device housing and covers; as well as other household and personal articles, including, for example, appliance housings, housewares, freezer containers, and crates; lawn and garden furniture; and building and construction sheet.

To illustrate the practice of this invention, examples of the preferred embodiments are set forth below. However, these examples do not in any manner restrict the scope of this invention.

EXAMPLES

The compositions of Examples 1 to 3 were compounded on a Werner and Pfleiderer ZSK-30, 30 millimeter (mm) twin screw extruder. Two Accurate Loss-In-Weight feeders were used, one to feed talc, when used, at one pound per hour and the other to feed the combined balance of components at two pounds per hour. The balance of components were hand blended prior to feeding through the Accurate Loss-In-Weight feeder. The feeders rested atop AWS3000 counterbalanced scales and were configured to an Accurate 7000 Series controller. Extruder output was 44 pounds per hour (lb/h.). The following were the compounding conditions on the ZSK-30 extruder: Barrel temperature profile: 95° C., 150° C., 220 ° C, 230° C.; Die temperature: 230° C.; Melt temperature: 236° C.; Screw speed: 200 revolutions per minute (rpm); Pressure: 130 pounds per square inch (psi); and Torque: 50. The extrudate was cooled in the form of strands and comminuted as pellets using a Sheer SGS50-E pelletizer. The pellets were used to prepare test specimens on a 100 ton Demag injection molding machine, having the following molding conditions: Barrel temperature profile: 21° C., 204° C., 215° C., 227° C, and 221° C.; Melt temperature: 224° C.; and Cycle time: 85 seconds.

The formulation content of Examples 1 to 3 is given in Table 1 below in parts by weight of the total composition. In Table 1:

"PP" is a high crystalline polypropylene available as ACCPRO™ 10-9934 available from BP Amoco Chemicals having a density of 0.917 g/cm$^3$, a melt flow rate of 34.6 at 230° C. and an applied load of 2.16 kg and a crystallinity determined by DSC of 70 weight percent as determined on a TA Instrument 2910 DSC apparatus by the method described hereinabove, the standard thermal history was established by allowing the sample to cool from 225° C. to room temperature and then cooling the sample from room temperature to −100° C. with liquid nitrogen;

"S/LEP" is a substantially linear ethylene/octene copolymer available as AFFINITY™ EG 8180 from The Dow Chemical Company having a density of approximately 0.863 g/cm$^3$, a melt flow rate of 0.5 g/10 min. determined at 190° C. and an applied load of 2.16 kg, and a CBDI of greater than 50;

"HDPE" is a high density polyethylene available as HDPE IP-60 from the Dow Chemical Company having a density of approximately 0.952 g/cm$^3$ and a melt flow rate of 60 determined at 190° C. and an applied load of 2.16 kg;

"TAIC 1" is a commercially available mineral talc available as VANTALC F2003 from Orlinger having a median particle size of 3 μm;

"TALC 2" is a commercially available mineral talc available as JETFIL 700C from Minerals Technology having a median particle size of 1.5 μm and a maximum particle size of 10 to 12 μm;

"Erucamide" is an unsaturated fatty amide with the formula $C_{21}H_{41}CONH_2$ available as KEMAMIDE™ E Ultra from Witco;

"IRGANOX™ 1010" is 3,5-bis(1,1-dimethylethyl)-4-hydroxy-2,2-bis[3-[3,5-bis(1,1-dimethylethyl)-4-hydroxyphenyl]oxo-propoxy]methyl-1,3-propanediyl ester antioxidant available from Ciba Geigy;

"IRGANOX B 225 FF" is a 1:1 mixture of IRGANOX 1010 and tris(2,4-di-tert-butylphenyl phosphite antioxidant available from Ciba Geigy in the form of a flake;

"IRGANOX B 225 DD" is a 1:1 mixture of IRGANOX 1010 and tris(2,4-di-tert-butylphenyl phosphite antioxidant available from Ciba Geigy in the form of a prill;

"CB-1" is a 35 precent carbon black concentrate available as 3530A from Southwest Chemical Services;

"CB-2" is powered carbon black;

"STRUKTOL™ TR 141" is a proprietary surface lubricity agent available from Struktol Corporation of America;

"TINUVIN™ 328" is a benzotriazole ultra violet light stabilizer available from Ciba Geigy;

"TINUVIN 770" is a hindered amine ultra violet light stabilizer available from Ciba Geigy.

TABLE 1

|  | Example | | |
| --- | --- | --- | --- |
| COMPOSITION | 1 | 2 | 3 |
| PP | 57 | 62 | 60 |
| S/LEP | 36 | 31 | 25 |
| HDPE |  | 7 |  |
| Talc-1 |  |  | 15 |
| Talc-2 | 7 |  |  |
| Erucamide | 0.5 |  | 0.3 |
| IRGANOX 1010 |  |  | 0.1 |
| IRGANOX B 225 FF |  |  | 0.1 |
| IRGANOX B 225 DD | 0.2 | 0.2 |  |
| CB-1 | 0.3 |  |  |
| CB-2 |  |  | 2.9 |
| STUKTOL TR 141 |  | 0.5 |  |
| TINUVIN 328 | 0.2 |  |  |
| TINUVIN 770 | 0.2 |  |  |

The following tests were run on Examples 1 to 3 and the results of these tests are shown in Table 2:

"MFR" melt flow rate was determined according to ASTM D 1238-90b-A on a Tinius-Olsen Extrusion PLAST-O-METER™ at 230° C. and an applied load of 2.16 kg;

"Density" was measured according to ASTM D 792-86-B;

"Hardness" Shore D hardness was measured according to ASTM D2240-86;

"Flexural Tangent Modulus" and "Flexural Secant Modulus" were determined in accordance with ASTM D 790M-861A. Testing was performed using an Instron Mini 55 mechanical tester;

"Tensile Yield" and "Tensile Break" were done in accordance with ASTM D 638M-89. Testing was performed using an United mechanical tester;

"Notched Izod" was determined according to ASTM D 256-90b-B at 23° C., 0° C. and −30° C. Specimens were cut from rectangular DTUL bars and measured 0.125 inches in thickness. The specimens were notched with a notcher to give a 0.100 inch ±0.002 inch radius notch. A standard Izod impact testing unit equipped with a cold temperature chamber and a 10 foot-pound (ft-lb) free falling hammer were used. Results are reported in foot-pounds per inch (ft-lb/in);

"Dart" instrumented impact was determined according to ASTM D 3763-95a using a General Research Corporation Dynatup 8250 instrumented impact tester with a 45.4 kg weight). Test results were determined at 23° C. and −30° C. and reported as inch-pounds (in-lb);

"HDUL" heat distortion under load was determined on a Ceast HDT 300 Vicat machine in accordance to ASTM D 648-82(88) where test specimens were unannealed and tested under an applied pressure of 66 psi and 264 psi;

"CLTE" coefficient of linear thermal expansion was measured according to ASTM D2240-86 from 30° C. to 80° C., results are reported as centimeter per centimeter times $10^{-6}/°$ C. (cm/cm×$10^{-6}/°$ C.); and "Ash" was determined using a Microwave Muffle Furnace MAS-7000.

TABLE II

| PROPERTIES | Example 1 | Example 2 | Example 3 |
|---|---|---|---|
| MFR @ 230° C./kg, g/10 min. | 12.6 | 13.1 | 14.1 |
| Density, g/cm$^3$ | 0.935 | 0.937 | 1.006 |
| Hardness | 61 | 65 | 65 |
| Flexural Tangent Modulus, 10$^6$ psi | 163 | 199 | 267 |
| Flexural Secant Modulus, 10$^6$ psi | 128 | 159 | 188 |
| Tensile Yield, psi | 2480 | 3060 | 3178 |
| Elongation at yield, % | 433 | 110 | 120 |
| Notch Izod, ft-lb/in | | | |
| 23° C. | 15 | 13 | 5 |
| 0° C. | 16 | 7 | 2 |
| −30° C. | 2 | 1.4 | 0.7 |
| Dart, in-lb | | | |
| 23° C. | | | 229 |
| −30° C. | | | 124 |
| HDUL at 66 psi, ° C. | 88 | 98 | 110 |
| HDUL at 264 psi, ° C. | 45 | 43 | 59 |
| CLTE 30° C. to 80° C., cm/cm × 10$^{-6}$/° C. | 61 | 69 | 75 |
| CLTE −30° C. to 30° C., cm/cm × 10$^{-6}$/° C. | 58 | 52 | 54 |
| Ash, % | 6.3 | 7 | 15 |

What is claimed is:

1. A propylene polymer composition comprising:
    (a) from about 55 to about 80 parts by weight of a high crystalline isotactic propylene polymer having a crystalline phase determined by differential scanning calorimetry equal to or greater than about 62 weight percent based on the weight of the high crystalline propylene polymer;
    (b) from about 20 to about 45 parts by weight of a substantially linear ethylene polymer, a linear ethylene polymer or combinations thereof, wherein the substantially linear ethylene polymer and linear ethylene polymer are characterized as having:
        (i) a density of less than about 0.93 g/cm$^3$,
        (ii) a molecular weight distribution, $M_w/M_n$, of less than about 3.0, and
        (iii) a Composition Distribution Branch Index of greater than 30 percent;
    (c) from 0 to about 50 parts by weight of a filler; and
    (d) from 0 to about 15 parts by weight of polyethylene, polystyrene, polycyclohexylethane, polyester, ethylene/styrene interpolymer, syndiotactic PP, syndiotactic PS, ethylene/propylene copolymer, EPDM, and mixtures thereof,
wherein parts by weight are based on the total weight of the propylene polymer composition.

2. The propylene polymer composition of claim 1 wherein the high crystalline isotactic propylene polymer is a homopolymer of propylene.

3. The propylene polymer composition of claim 1 wherein the high crystalline isotactic propylene polymer is a copolymer of propylene and a $C_2$ or $C_4$ to $C_{20}$ alpha-olefin.

4. The composition of claim 1 wherein the substantially linear ethylene polymer or linear ethylene polymer is a copolymer of ethylene with a $C_3$ to $C_{20}$ alpha-olefin.

5. The composition of claim 1 wherein the substantially linear ethylene polymer or linear ethylene polymer is a copolymer of ethylene with propylene, 1-butene, 1-hexene, 4-methyl-1-pentane or 1-octene.

6. The composition of claim 1 wherein the substantially linear ethylene polymer or linear ethylene polymer is a copolymer of ethylene and 1-octene.

7. The propylene polymer composition of claim 1 wherein the filler is present in an amount from about 3 to about 15 parts by weight.

8. The composition ol claim 7 wherein the filler is talc, wollastonite, clay, single layers of a cation exchanging layered silicate material or mixtures thereof.

9. The composition of claim 7 wherein the filler is talc.

10. The propylene polymer composition of claim 7 wherein the filler has a length to thickness ratio between 1 to 10,000.

11. The propylene polymer of claim 7 wherein the filler has an average particle size of about 0.001 to about 10 microns.

12. The propylene polymer composition of claim 1 wherein the additional polymer is present in an amount from about 5 to about 15 parts by weight.

13. The propylene polymer composition of claim 12 wherein the additional polymer is a high density polyethylene.

14. The propylene polymer of claim 1 further comprising from about 0.1 to about 1 parts by weight of erucamide, oleamide, linoleamide, or steramide.

15. The propylene polymer of claim 1 in which component (a) is a blend of high crystalline polypropylene and graft-modified high crystalline propylene.

16. A method for preparing a propylene polymer composition comprising the step of combining:
    (a) from about 55 to about 80 parts by weight of a high crystalline isotactic propylene polymer having a crystalline phase determined by differential scanning calorimetry equal to or greater than about 62 weight percent based on the weight of the high crystalline propylene polymer;
    (b) from about 20 to about 45 parts by weight of a substantially linear ethylene polymer, a linear ethylene polymer or combinations thereof, wherein the substantially linear ethylene polymer and linear ethylene polymer are characterized as having:
        (i) a density of less than about 0.93 g/cm$^3$,
        (ii) a molecular weight distribution, $M_w/M_n$, of less than about 3.0, and
        (iii) a Composition Distribution Branch Index of greater than 30 percent;
    (c) from 0 to about 50 parts by weight of a filler, and
    (d) from 0 to about 15 parts by weight of polyethylene, polystyrene, polycyclohexylethane, polyester, ethylene/styrene interpolymer, syndiotactic PP, syndiotactic PS, ethylene/propylene copolymer, EPDM, and mixtures thereof,
wherein parts by weight are based on the total weight of the propylene polymer composition.

17. A method for producing a molded or extruded article of a polymer blend composition comprising the steps of:
    (A) preparing a propylene polymer composition comprising:
        (a) from about 55 to about 80 parts by weight of a high crystalline isotactic propylene polymer having a crystalline phase determined by differential scanning calorimetry equal to or greater than about 62 weight percent based on the weight of the high crystalline propylene polymer;
        (b) from about 20 to about 45 parts by weight of a substantially linear ethylene polymer, a linear ethylene polymer or combinations thereof, wherein the substantially linear ethylene polymer and linear ethylene polymer are characterized as having:

(i) a density of less than about 0.93 g/cm$^3$,
(ii) a molecular weight distribution, $M_w/M_n$, of less than about 3.0, and
(iii) a Composition Distribution Branch Index of greater than 30 percent;
(c) from 0 to about 50 parts by weight of a filler, and
(d) from 0 to about 15 parts by weight of polyethylene, polystyrene, polycyclohexylethane, polyester, ethylene/styrene interpolymer, syndiotactic PP, syndiotactic PS, ethylene/propylene copolymer, EPDM, and mixtures thereof, wherein parts by weight are based on the total weight of the propylene polymer composition and (B) molding or extruding said propylene polymer composition into molded or extruded article.

18. The method of claim 17 wherein the molded or extruded article is selected from the group consisting of an automotive bumper beam, an automotive bumper fascia, an automotive pillar, an automotive instrument panel, an electrical equipment device housing, an electrical equipment device cover, an appliance housing, a freezer container, a crate, and lawn and garden furniture.

19. The composition of claim 1 in the form of a molded or extruded article.

20. The molded or extruded article of claim 16 is selected from the group consisting of an automotive bumper beam, an automotive bumper fascia, an automotive pillar, an automotive instrument panel, an electrical equipment device housing, an electrical equipment device cover, an appliance housing, a freezer container, a crate, and lawn and garden furniture.

* * * * *